United States Patent Office 3,328,128
Patented June 27, 1967

3,328,128
PROCESS FOR THE MANUFACTURE OF HYDROGEN PEROXIDE
Gerhard Käbisch, Rheinfelden, Baden, Germany, assignor, by mesne assignments, to FMC Corporation, New York, N.Y., a corporation of Delaware
No Drawing. Filed Aug. 21, 1964, Ser. No. 391,309
Claims priority, application Germany, Sept. 3, 1963, D 42,393
4 Claims. (Cl. 23—207)

This invention relates to the manufacture of hydrogen peroxide by the alternate oxidation and reduction of anthraquinones, and particularly to the use in this process, known as the anthraquinone process, of a novel solvent mixture for the anthraquinone compound.

In the anthraquinone process a substituted anthraquinone, known in the art as the working compound, is dissolved in a so-called working solvent and the work solution thus obtained is hydrogenated in the presence of a catalyst to the extent that about 50% of the substituted anthraquinone is converted to the corresponding substituted anthrahydroquinone. This anthrahydroquinone is oxidized by treatment with a gas containing oxygen, whereby the anthraquinone is regenerated and hydrogen peroxide is produced. The hydrogen peroxide is then extracted from the organic phase with an aqueous solvent, the extraction normally being carried out in a vertical column with aqueous extracting phase moving downwardly countercurrently to an upwardly moving oil phase of the work solution initially containing the hydrogen peroxide.

A cyclic process is provided by returning the work solution to the hydrogenation stage and cyclic repetition of the individual steps described above. It is important, therefore, that the work solution have physical properties, e.g. viscosity and density, which meet the requirements for efficient operation of all steps in the cycle, and that it chemically produce as great a yield of hydrogen peroxide per pass through the cycle as is possible. This latter in turn is dependent upon the solubility of the reaction carrier, or working compound, and therefore the proportion of the cycling work solution which represents reactive material.

Several techniques have been proposed heretofore for obtaining a high solubility of the working compound; they may be divided into two general approaches. The first approach involves a search for special anthraquinone derivatives, referred to often simply as anthraquinones or substituted anthraquinones, having high solubilities in solvents. Such quinone derivatives include 2-tertiary butylanthraquinone, amylanthraquinones, tetrahydroanthraquinones, mixtures of isopropyl- and secondary-butylanthraquinone, eutectic mixtures of anthraquinones, esters of anthraquinone carboxylic acids and heteronuclearly disubstituted alkylanthraquinones.

The second approach involves use of special solvents or solvent mixtures with selective dissolving abilities for the anthraquinone and/or anthrahydroquinone forms of the working compound. The requirements for such solvents to be applied in operating plants are varied and difficult to satisfy, and the attempt has been made to satisfy as many requirements as possible by combinations of various solvents.

In general these solvent combinations contain as individual components a solvent particularly effective in dissolving the anthraquinone form, and a solvent particularly effective in dissolving the anthrahydroquinone form. Inert additives sometimes are added to these solvent mixtures to provide properties needed to satisfy particular requirements, such as the need for low viscosities and densities. The low viscosity is important for mechanical reasons in cycling of the working compound through the reaction equipment, and the density must be substantially different from the density of the water-hydrogen peroxide solution resulting from water extraction of the hydrogen peroxide from the organic work solution, in order to facilitate the extraction.

Several known solvent combinations are given here; in these combinations the solvent for the anthraquinone form is recited first: $C_8$ to $C_{17}$ ketone or xylene and $C_5$ to $C_{12}$ alcohol; anisole and heptyl alcohols; benzene or alkyl benzene and methylcyclohexanol acetate; methylnaphthalene, tertiary-butyl toluene or xylene and diisobutylcarbinol; methylnaphthalene and a phosphoric acid ester. While they have been found useful, none of these particular mixtures or other solvent mixtures employed by prior workers have satisfied all of the requirements for systems of this kind.

It therefore has remained desirable, and it is an object of this invention, to provide a new solvent mixture which satisfies the varied requirements of the anthraquinone process, namely the requirements that the solvent have a high dissolving power for both the anthraquinone and anthrahydroquinone forms of working compounds, a low viscosity and therefore the ability to be circulated easily through the process and a low density relative to the water-hydrogen peroxide extraction phase thereby facilitating extraction of the hydrogen peroxide from the work solution.

It has now been found that a solvent mixture consisting essentially of a polyalkylated benzene having 9 to 11 carbon atoms and a trisubstituted organic ester of phosphoric acid, the former being the solvent for the anthraquinone form of the working compound and the phosphoric acid ester being the solvent for the anthrahydroquinone form of the working compound, is a highly effective solvent combination which satisfies essentially all of the requirements for an ideal solvent in the anthraquinone process. This combination preferably contains about 60 to 85 volume percent of the polyalkylated benzene and about 40 to 15 volume percent of the phosphoric acid ester, and is used in the amount of at least about 37.5 volume percent of the total volume of the work solution.

The polyalkylated benzenes useful in the herein solvent mixtures as the solvent for the anthraquinone form of the working compound are benzenes carrying alkyl substituents and having a total of 9 to 11 carbon atoms. These compounds may be the trimethyl, methylethyl, methylbutyl, tetramethyl and the like benzenes.

These compounds are available in the form of individual isomers or of mixtures of isomers, as well as in admixtures containing various compounds within the defined class. Likewise, they are frequently obtained in mixtures comprising from about 70% up to substantially 100% of the polyalkylated benzene, with the balance largely being paraffinic compounds having roughly the same boiling temperatures as the boiling temperatures of polyalkylated benzenes, namely about 145° to 320° C. When they are used in such mixtures, the volume percentages of the polyalkylated benzenes are calculated on the basis of the amounts of these compounds present relative to the phosphoric acid ester, not taking into account the amount of paraffin hydrocarbon present.

Typical polyalkylated benzene solvent compositions in which mixtures of various class compounds and paraffinic compounds are present, are Solvents A and B, referred to hereinafter in the examples. These solvents have the following compositions:

TABLE 1

| Ingredient: | Volume percent |
|---|---|
| Solvent A— | |
| 1,3,5-trimethylbenzene | 15 |
| 1,2,4-trimethylbenzene | 43 |
| 1,2,3-trimethylbenzene | 12 |
| 1-methyl 4-ethylbenzene | 2 |
| 1-methyl 3-ethylbenzene | 6 |
| 1-methyl 2-ethylbenzene | 2 |
| Paraffins | 20 |
| Solvent B— | |
| Dimethylethyl and tetramethylbenzenes | 71 |
| C–11 alkylated benzenes | 22 |
| Paraffins | 7 |

These compounds most suitably are derived from petroleum, and when derived from this source are particularly useful because of their low contents of sulfur and other poisons for the hydrogenation catalysts used in the anthraquinone process. The compounds are derived by catalytic reformation of desulfurized straight run benzines, for example through aromatizing aliphatics, dehydrogenating naphthenes and cracking and aromatizing of the heavy components of the straight run benzine.

The trisubstituted organic esters of phosphoric acid, used as solvents for the anthrahydroquinone form of the working compound, are phosphates on which there are three hydrocarbon substituents, which substituents may be alkyl or aryl groups. Typical useful phosphates are trioctylphosphate, tributylphosphate, diphenyloctylphosphate, diphenylcresylphosphate and tricresylphosphate. These phosphates and their use in the anthraquinone process are described in U.S. Patent 2,537,655 to Dawsey et al. The following table shows the solubility of 2-ethylanthrahydroquinone in various phosphates from this class:

TABLE 2

| Solvent: | Grams of 2-ethylanthrahydroquinone soluble in a liter of solvent at 25° C. |
|---|---|
| Tributylphosphate | 366 |
| Trioctylphosphate | 202 |
| Diphenylcresylphosphate | 136 |
| Diphenyloctylphosphate | 165 |
| Tricresylphosphate | 154 |

The ratio of anthraquinone solvent to anthrahydroquinone solvent may be varied within reasonably broad limits, and other solvents and/or inert substances may be added to the solvent mixture. Particularly useful solvent combinations are those in which the ratio of anthraquinone solvent to anthrahydroquinone solvent, that is of the polyalkylated benzene to the phosphoric acid ester, is about 60 to 85 volumes of the former to 40 to 15 volumes of the latter. These solvents are used in the work solution in an amount of at least about 37.5% by volume thereof, that is in an amount to provide at least about 15% by volume of the phosphoric acid ester. Use of less solvent causes the resulting work solution to have properties which make it difficult to process. The maximum amount which may be used is dictated by economic considerations. It is obvious that use of too much solvent reduces the amount of reactive work compound which may be present.

It is possible to use the herein amounts of the substituted phosphate for the reason that these materials dissolve unusually large amount of anthrahydroquinones, such that a liter of a solvent mixture consisting of 75 volume percent of trimethylbenzene and only 25 percent by volume of trioctylphosphate at a temperature of 20° C. dissolves more 2-ethylanthrahydroquinone than do solvent mixtures of the same trimethylbenzene with two typical prior art solvents for anthrahydroquinones, namely diisobutylcarbinol and methylcyclohexanol acetate in which the anthrahydroquinone solvent is present in the amount of one-half rather than 25%, or one-fourth, of the total solvent mixture. This is shown in Table 3 which follows:

TABLE 3

| Solvent Mixture | Maximum solubility of 2-ethylanthrahydroquinone (g./l. of solvent) at— | | |
|---|---|---|---|
| | 20° C. | 30° C. | 40° C. |
| 75% by vol. trimethylbenzene, 25% by vol. trioctylphosphate | 60 | 62 | 64 |
| 50% by vol. trimethylbenzene, 50% by vol. diisobutylcarbinol (comparative) | 40 | 42 | 44 |
| 50% by vol. trimethylbenzene, 50% by vol. methylcyclohexanol acetate (comparative) | 44 | 45 | 46 |

Accordingly, the particular solvent mixture of this invention has an unusual ability to dissolve the anthrahydroquinone form of the working compound, such that the polyalkylated benzene component which is the anthraquinone solvent can be correspondingly increased in amount, thereby minimizing the danger of work compound crystallizing out of the work solution when it is in the anthraquinone form, and also providing a higher yield of hydrogen peroxide per unit volume of reaction equipment.

All of the heretofore used anthraquinone working compounds, namely the substituted anthraquinones, may be employed with the herein solvent mixtures. Thus the alkylanthraquinones, the anthraquinone carboxylic acid esters, the anthraquinone sulfonic acid esters, the halogenated anthraquinones and other prior art anthraquinones used in the anthraquinone process are useful with the present solvent mixtures. Particularly useful anthraquinones are 2-ethylanthraquinone, tetrahydroethylanthraquinone, tert.-butylanthraquinone and amylanthraquinone. Their solubilities in terms of grams of the anthraquinone soluble per liter of a typical polyalkylated benzene of this invention, namely Solvent A, are as follows:

TABLE 4

| Anthraquinone Derative | Grams Soluble in a Liter of Solvent A | | |
|---|---|---|---|
| | 20° C. | 30° C. | 40° C. |
| Ethylanthraquinone | 200 | 260 | 322 |
| Tetrahydroethylanthraquinone | 187 | 196 | 218 |
| Tert.-butylanthraquinone | 480 | 598 | 755 |
| Amylanthraquinone | 214 | 296 | 444 |

The previously used anthraquinone solvents from the naphthalene class, particularly the α- and β-monomethylnaphthalenes and the dimethylnaphthalenes, show similar or even slightly better dissolving powers for the anthraquinones. However, use of the naphthalene compounds in the anthraquinone process gives rise to poisoning of the hydrogenation catalyst due to the derivation of these materials from tar distillation fractions which contain catalyst poisons. Costly preliminary purification of the naphthalene therefore is necessary, whereas in the case of the polyalkylated benzenes it is avoided. Furthermore, a comparison of the viscosity and density values for the trimethyl benzenes such as Solvent A, and dimethylnaphthalene, shows that the dimethylnaphthalene has a density very close to that of water, so that it is difficult to separate it from water in the hydrogen peroxide extraction step, and furthermore that it has a very high viscosity in comparison with the trimethylbenzene, which makes it difficult to cycle a working compound containing it through the reaction equipment.

The following table demonstrates this difference in properties:

TABLE 5

| Property | Solvent A | Dimethyl-naphthalene |
|---|---|---|
| Density at 20° C. (water is 1.0) | 0.875 | 0.999 |
| Viscosity at 20° C. in cp | .59 | 3.50 |

Use of Solvent A, having these properties, translated into the following practical operating advantages over use of dimethylnaphthalene. The height of the extraction column required to extract hydrogen peroxide from a typical work solution containing the Solvent A was about 15% less than the column length required when dimethylnaphthalene was used. Further it was possible to put through a reactor column having the same height and cross-sectional area, 25% more work solution employing the Solvent A polyalkylated benzene than was possible when employing dimethylnaphthalene. Incidentally, foam formation in the oxidation stage was reduced with Solvent A, and separation of the hydrogenation catalyst accordingly was facilitated where suspension catalysis was employed.

The following Table 6 presents important physical properties of four typical polyalkylated benzene solvents of the present invention together with those for a comparative solvent, dimethylnaphthalene. This Table 6 presents the densities, refractive indices, viscosities and boiling temperature ranges for these various solvents, and additionally shows the solubility of 2-ethylanthraquinone at 20°, 30° and 40° C. in grams of the ethylanthraquinone soluble per liter of the indicated solvents.

The densities and viscosities of working solutions prepared with the polyalkylated benzene solvents of this invention are correspondingly better in each case than the densities and viscosities of such working solutions prepared with the dimethylnaphthalene, and all of these solvents have highly satisfactory dissolving powers for the ethylanthraquinone.

The following example is presented by way of illustration of this invention, and is not to be considered limiting thereof in any way.

*Example 1*

One hundred and thirty grams of 2-ethylanthraquinone was dissolved in a solvent mixture consisting of 25 parts by volume of trioctylphosphate and 75 parts by volume of Solvent A (polyalkylated benzenes). The work solution provided thereby was exposed to hydrogen in a hydrogenation apparatus in the presence of a fluidized palladium black catalyst at a temperature of 45° C., at a solution flow of 500 liters of solution per hour and a gas flow of 2580 liters of hydrogen per hour. The hydrogen uptake corresponded to a 46% hydrogenation of the anthraquinone present, and an almost quantitative uptake of the hydrogen. The hydrogenation catalyst was separated by filtration, and the hydrogenated solution was oxidized at 43° C. with an amount of air to provide an excess of 30% over the amount required for the oxidation. There thereby was produced 8.6 grams of hydrogen peroxide per liter of work solution. This hydrogen peroxide was extracted with water in an extraction column, and the organic phase returned to the hydrogenator for further cycling.

*Examples 2, 3 and 4 (see Table 7)*

These examples demonstrate the effectiveness of typical solvent mixtures of this invention in the hydrogenation, oxidation and hydrogen peroxide extraction steps of the anthraquinone process, and also the resistance of a work solution containing one of these solvent mixtures to formation of a typical by-product.

Example 2, a comparative example, employed a liter of a prior art solvent mixture consisting of 47.25 volume percent of dimethylnaphthalene, 20.25 volume percent of KOG (paraffinic hydrocarbons, 90% of which boil at 195° to 234° C. at atmospheric pressure) and 32.5 volume percent of trioctylphosphate. In this and the solvent systems given below there was dissolved about 130 grams of the 2-ethylanthraquinone or 2-ethylanthrahydroquinone, as applies.

Example 3 employed a liter of a solvent system of this invention, which is a 70:30 by volume mixture of Solvent A (polyalkylated benzenes) and trioctylphosphate, whereas Example 4 employed a liter of a 70:30 by volume mixture of Solvent B (polyalkylated benzenes) and trioctylphosphate, likewise a solvent mixture of this invention.

TABLE 6.—ANTHRAQUINONE SOLVENTS

| | Solvent A | Solvent B | 1,3,5-trimethylbenzene | 1,2,4-trimethylbenzene | Dimethyl-naphthalene |
|---|---|---|---|---|---|
| Density $D_4^{20}$ | 0.875 | 0.889 | 0.8651 | 0.8758 | 0.999 |
| Refractive Index $n_d^{20}$ | 1.504 | 1.5106 | 1.499 | 1.505 | 1.602 |
| Viscosity at 20° C. in cp | 0.59 | 1.18 | | 1.00 | 3.5 |
| Boiling Range at 760 mm. Hg | 158–186 | 184–202 | 163–165 | 169 | 249–262 |
| Sol. EAQ,* g./l. solvent: | | | | | |
| 20° C | 200 | 226 | 200 | 249 | 230 |
| 30° C | 260 | 358 | 261 | 324 | 375 |
| 40° C | 322 | 476 | 350 | 419 | 500 |

*2-ethylanthraquinone.

TABLE 7.—COMPARISON OF SOLVENT IN OPERATION

| Test | Quinone | Example 2 | Parts by Volume | Example 3 | Parts by Volume | Example 4 | Parts by Volume |
|---|---|---|---|---|---|---|---|
| | | Dimethyl-naphthalene. | 47.25 | Solvent A | 70 | Solvent B | 70 |
| | | KOG* | 20.25 | Trioctyl Phosphate. | 30 | Trioctyl Phosphate. | 30 |
| | | Trioctyl Phosphate. | 32.50 | | | | |
| Hydrogenation Rate [1] | 2-ethylanthraquinone | 46 | | 65 | | | |
| | 2-ethylanthrahydroquinone | 26 | | 42 | | | |
| Rate of Formation of Tetrahydro-2-ethylanthraquinone.[2] | 2-ethylanthraquinone | 3.0 | | | | 1.1 | |
| Oxidation Rate [3] | 2-ethylanthraquinone | 30 | | | | 28.8 | |
| | 2-ethylanthrahydroquinone | 185 | | | | 153 | |
| Hydrogen Peroxide Extractibility.[4] | 2-ethylanthraquinone | 40 | | 47 | | | |

*KOG is a paraffinic hydrocarbon, 90% of which boils at 195°–234° C. at atmospheric pressure.

[1] Hydrogenation rate was determined by passing hydrogen through 100 ml. of solution in contact with 50 mg. of palladium black at 35° C. The value given is ml. of hydrogen taken up per minute between 2 and 3 minutes from the start of the test.

[2] Rate of formation of tetrahydro-2-ethylanthraquinone was determined by permitting 250 ml. of 50% hydrogenated solution to stand for 24 hours at 60° C. in an N₂ atmosphere over 1.25 g. of palladium black. The value given is the percent of tetrahydro-2-ethylanthraquinone found in the solution after the 24-hour period.

[3] Oxidation rate was determined by oxidizing 250 ml. of a 50% hydrogenated solution with air introduced at the rate of 12 liters per hour. The value given is the minutes required to oxidize the solution completely.

[4] Hydrogen peroxide extractibility is given in terms of the distribution coefficients. This value is determined by shaking together equal volumes of a 20% aqueous hydrogen peroxide work solution, separating the aqueous and organic phases, determining the concentrations of hydrogen peroxide in the two phases, and dividing the concentration in the aqueous phase by the concentration in the organic phase. Ease of extraction with water increases with an increasing distribution coefficient.

The above examples demonstrate the effectiveness in the hydrogenation, oxidation and extraction steps of the anthraquinone process exhibited by the present solvent mixtures containing polyalkylated benzenes and a substituted phosphate. This high effectiveness, coupled with the density and viscosity advantages of the herein solvent mixtures, renders them particularly suited for use in the anthraquinone process for producing hydrogen peroxide. This is particularly so in that this use of these solvent mixtures provides the added advantage of causing the working compound to be resistant to change by formation of by-products, as demonstrated in Table 7 by the data relative to rate of formation of tetrahydro-2-ethylanthraquinone.

Pursuant ot the requirements of the patent statutes, the principle of this invention has been explained and exemplified in a manner so that it can be readily practiced by those skilled in the art, such exemplification including what is considered to represent the best embodiment of the invention. However, it should be clearly understood that, within the scope of the appended claims, the invention may be practiced by those skilled in the art and having the benefit of this disclosure otherwise than as specifically described and exemplified herein.

What is claimed is:

1. A process for producing hydrogen peroxide by the alternate reduction and oxidation of a substituted anthraquinone working compound carried in a work solution, hydrogen peroxide being produced by the oxidation and extracted from said work solution with an aqueous solvent, in which said substituted anthraquinone working compound is dissolved in a working solvent consisting essentially of a polyalkylated benzene having 9 to 11 carbon atoms and a trisubstituted organic ester of phosphoric acid, said working solvent containing 60 to 85 volume percent of said polyalkylated benzene and 40 to 15 volume percent of said trisubstituted organic ester of phosphoric acid.

2. The process of claim 1 in which the solvent mixture is present in the work solution in the amount of at least 37.5 volume percent of said work solution.

3. The process of claim 2 in which the polyalkylated benzene has a boiling temperature at 760 millimeters of mercury pressure of above 145° C. and is substituted with alkyl substituents from the group consisting of methyl radicals and ethyl radicals.

4. The process of claim 2 in which the trisubstituted organic ester of phosphoric acid is trioctylphosphate.

References Cited

UNITED STATES PATENTS 2,768,065 10/1956 Dawsey et al. ———— 23—207
2,927,002 3/1960 Le Feuvre ———— 23—207

OSCAR R. VERTIZ, Primary Examiner.

H. S. MILLER, Assistant Examiner.